(12) United States Patent
Brethes

(10) Patent No.: US 12,390,935 B2
(45) Date of Patent: Aug. 19, 2025

(54) DEVICE, SYSTEM AND METHOD FOR LOCATING, BY A PROCESSING MODULE, AN ACQUISITION MODULE RELATIVE TO A DEVICE TO BE MONITORED

(71) Applicant: Dassault Systèmes, Vélizy-Villacoublay (FR)

(72) Inventor: Ludovic Brethes, Escalquens (FR)

(73) Assignee: Dassault Systèmes, Vélizy-villacoublay (FR)

( * ) Notice: Subject to any disclaimer, the term of this patent is extended or adjusted under 35 U.S.C. 154(b) by 737 days.

(21) Appl. No.: 17/278,535

(22) PCT Filed: Sep. 19, 2019

(86) PCT No.: PCT/FR2019/052195
§ 371 (c)(1),
(2) Date: Apr. 14, 2021

(87) PCT Pub. No.: WO2020/058641
PCT Pub. Date: Mar. 26, 2020

(65) Prior Publication Data
US 2021/0347056 A1    Nov. 11, 2021

(30) Foreign Application Priority Data
Sep. 21, 2018   (FR) ...................... 1858575

(51) Int. Cl.
*B25J 9/16*      (2006.01)
*B25J 13/08*     (2006.01)
(Continued)

(52) U.S. Cl.
CPC .......... *B25J 9/1697* (2013.01); *B25J 9/1671* (2013.01); *B25J 13/088* (2013.01); *G06T 7/70* (2017.01);
(Continued)

(58) Field of Classification Search
CPC ...... B25J 9/1697; B25J 9/1671; B25J 13/088; G06T 7/70; G06T 1/20;
(Continued)

(56) References Cited

U.S. PATENT DOCUMENTS

2007/0110420 A1* 5/2007 Samadani .............. G03B 13/36
                                                348/E5.045
2008/0267454 A1* 10/2008 Kobayashi ............. G01B 11/14
                                                382/106

(Continued)

FOREIGN PATENT DOCUMENTS

CN         101294793 A         10/2008
CN         104898956 A          9/2015
(Continued)

OTHER PUBLICATIONS

International Search Report for International Application No. PCT/FR2019/052195 dated Jan. 23, 2020, 4 pages.
(Continued)

*Primary Examiner* — Nay A Maung
*Assistant Examiner* — Dustin Bilodeau
(74) *Attorney, Agent, or Firm* — TraskBritt

(57) ABSTRACT

A device for locating, by a processing module, an acquisition module relative to a device to be monitored, comprises first processing means arranged in the region of the acquisition module, configured to generate a first position of the acquisition module, and to generate an image, referred to as a high-resolution image, of the device to be monitored; communication modules for transmitting, from the acquisition module to the processing module, the first position and the high-resolution image; and second processing means, arranged in the region of the processing module, configured to generate a second position, from the first position and the high-resolution image.

14 Claims, 3 Drawing Sheets

(51) Int. Cl.
  *G06T 7/70* (2017.01)
  *H04N 23/67* (2023.01)
  *H04N 23/951* (2023.01)
  *G06T 1/20* (2006.01)
(52) U.S. Cl.
  CPC .......... *H04N 23/67* (2023.01); *H04N 23/951* (2023.01); *G06T 1/20* (2013.01)
(58) Field of Classification Search
  CPC .......... G06T 2207/30244; G06T 7/001; H04N 23/67; H04N 23/951; G05B 2219/40415
  See application file for complete search history.

(56) References Cited

U.S. PATENT DOCUMENTS

| | | | |
|---|---|---|---|
| 2013/0010081 A1* | 1/2013 | Tenney | H04N 13/20 348/47 |
| 2015/0178928 A1* | 6/2015 | Mika | G06T 7/74 348/142 |
| 2018/0074306 A1* | 3/2018 | Visscher | A61B 5/0064 |
| 2019/0299411 A1* | 10/2019 | Kumar | B25J 9/1682 |

FOREIGN PATENT DOCUMENTS

| | | |
|---|---|---|
| CN | 106529497 A | 3/2017 |
| CN | 107491778 A | 12/2017 |
| EP | 1986154 A1 | 10/2008 |
| EP | 3208774 A1 | 8/2017 |
| FR | 3022527 B1 | 12/2017 |
| JP | 2019150931 A * | 9/2019 |
| WO | 2011/104167 A1 | 9/2011 |

OTHER PUBLICATIONS

International Written Opinion for International Application No. PCT/FR2019/052195 dated Jan. 23, 2020, 20 pages.
Wang et al., DeLS-3D: Deep Localization and Segmentation with a 3D Semantic Map, http://www.rieglusa.com/index.html, May 13, 2019, 10 pages.
Chinese Notification of the First Office Action for Application No. 201980069599.5 dated May 6, 2024, 6 pages.
European Communication under Article 94(3) EPC for Application No. 19794606.4 dated Mar. 10, 2025, 17 pages with machine translation.
Sensopart, Visor Vision Sensor, Pick & Place with Universal Robot (UR5), https://www.youtube.com/watch?v=9rDPeXzanh8&ab_channel=SensoPart, Jun. 15, 2026, 2 pages.
Shih et al., A Simple Robotic Eye-In-Hand Camera Positioning and Aligning Control Method Based on Parallelogram Features, Robotics, vol. 7, No. 2, (Jun. 18, 2018), 14 pages.

* cited by examiner

DEVICE, SYSTEM AND METHOD FOR LOCATING, BY A PROCESSING MODULE, AN ACQUISITION MODULE RELATIVE TO A DEVICE TO BE MONITORED

CROSS-REFERENCE TO RELATED APPLICATIONS

This application is a national phase entry under 35 U.S.C. § 371 of International Patent Application PCT/FR2019/052195, filed Sep. 19, 2019, designating the United States of America and published as International Patent Publication WO 2020/058641 A1 on Mar. 26, 2020, which claims the benefit under Article 8 of the Patent Cooperation Treaty to French Patent Application Serial No. 1858575, filed Sep. 21, 2018.

TECHNICAL FIELD

The present disclosure relates to a method for locating an image acquisition unit in the reference frame of a device to be monitored.

It also relates to a device that implements the location method, an image acquisition unit, such as a robot or tablet, having on board at least a portion of the device and a system comprising the device.

The field of the disclosure is that of the non-destructive monitoring of device compliance by means of a camera, during production, in use or in the context of maintenance, asynchronously or not.

BACKGROUND

In compliance monitoring, ground operators have on board a camera intended to capture an image stream of a device on which interventions or operations are to be carried out.

EP 1986154 A1 discloses a measurement device, which measures the relative position and orientation of an image capture means that capture images of one or more devices to be monitored. The respective geometric characteristics present in a 3D model of the device to be monitored are projected onto the captured image, based on the position and orientation of the image capture means, thus obtaining geometric projection characteristics. The relative position and orientation of the image capture means with regard to the measurement object are then calculated using the selected geometric projection characteristics and the geometric image characteristics corresponding to the selected geometric projection characteristics detected in the captured image.

A drawback of the measurement device according to the prior art is that the device has on board a computational unit that is powerful and therefore expensive, and also may be heavy.

The object of the present disclosure is to propose a location method aimed at reducing the computational power of the measurement device.

BRIEF SUMMARY

This object is achieved with a device for locating, by a processing module, an acquisition module relative to a device to be monitored comprising:
  first processing means arranged in the region of an acquisition module, configured to generate a first position of the acquisition module, and to generate an image, referred to as a high-resolution image, of the device to be monitored;
  means for transmitting the first position and the high-resolution image from the acquisition module to the processing module;
  second processing means arranged in the region of the processing module, configured to generate a second position from the first position and the high-resolution image.

Thus, it becomes possible to transfer the computational load in the region of the processing module and thus to reduce the computational power arranged in the region of the acquisition module, in other words in the region of the measurement device.

The device according to the disclosure may also comprise a graphics processing unit arranged in the region of the processing module.

Advantageously, the device according to the disclosure also comprises image capture means, referred to as high-resolution image capture means, the image generated by the first processing means being generated from data captured by the high-resolution image capture means.

As an example, the high-resolution image capture means may comprise an objective having a focal length, referred to as a long focal length, of between 18 mm and 50 mm, preferably 25 mm.

According to one embodiment, the device according to the disclosure comprises capture means arranged in the region of an acquisition module and configured to capture a physical quantity and to generate capture data, the first processing means also being configured to generate the first position from the capture data.

In particular, the capture means may comprise an inertial unit.

According to one option, the capture means may comprise image capture means, referred to as low-resolution image capture means, the capture data being images generated by the image capture means.

Yet more precisely, the low-resolution image capture means may be configured such that the images generated comprise a capture of the element to be monitored in its entirety.

Preferably, the low-resolution image capture means may comprise an objective having a focal length, referred to as a short focal length, of between 4.5 mm and 10 mm, preferably substantially equal to 7 mm.

According to one embodiment, the processing means arranged in the region of the processing module may also be configured to generate:
  data for simulating a projection of a digital model of the device to be monitored onto the high-resolution image,
  data on the state of compliance of the device to be monitored relative to the digital model of the device to be monitored.

According to a second aspect of the disclosure, a system is proposed comprising:
  an acquisition module,
  a processing module,
  a device for locating, by the processing module, an acquisition module relative to a device to be monitored according to the first aspect of the disclosure, or one or more of the improvements thereof.

The acquisition module may be the robot effector, it being possible for the processing module to be arranged in the region of the frame of the robot.

For example, the robot may be a robot of the cobot type.

The acquisition module may be a digital tablet.

According to a third aspect of the disclosure, a method for locating, by a processing module, an acquisition module relative to a device to be monitored is proposed, comprising:

processing, by processing means arranged in the region of the acquisition module, to generate a first position of the acquisition module, and to generate an image, referred to as a high-resolution image, of the device to be monitored;

transmission by transmission means of the first position and the high-resolution image from the acquisition module to the processing module, processing by the processing means arranged in the region of the processing module, to generate a second position from the first position and from the high-resolution image.

According to one option, the processing to generate the second position from the high-resolution image may be carried out using the high-resolution image in its entirety.

According to another option, the processing to generate the second position from the high-resolution image may be carried out from a selection of a portion, referred to as a specific portion, of the high-resolution image.

Preferably, the method also comprises additional processing, by the processing means arranged in the region of the processing module, to generate a third position, from the second position and from a digital model of the device to be monitored.

According to a fourth aspect of the disclosure, a method is proposed for monitoring, by a processing module, a device to be monitored from an image, referred to as a high-resolution image, of the device to be monitored, acquired by an acquisition module comprising the steps of a location method according to the third aspect of the disclosure, or one or more of the improvements thereof, and also:

a simulation, by the processing means arranged in the region of the processing module, of a projection of a digital model of the device to be monitored onto the high-resolution image, obtaining a state of compliance of the device to be monitored relative to the digital model of the device to be monitored.

The method for monitoring the device to be monitored may also comprise, between the simulation step and the step of obtaining a state of compliance, a comparison of the simulated image with one or more images of the device to be monitored.

According to one option, an image of the device to be monitored is acquired from data captured by image capture means, referred to as low-resolution image capture means, arranged in the region of the acquisition module.

Preferably, an image of the device to be monitored is acquired from the high-resolution image.

BRIEF DESCRIPTION OF THE DRAWINGS

Other data, features and advantages of the present disclosure will appear on reading the description of implementations and embodiments that are in no way limiting, with reference to the accompanying drawings in which.

DETAILED DESCRIPTION

As the embodiments described below are in no way limiting, variants of the disclosure, in particular, may be considered that comprise only a selection of the features described, then isolated from the other features described, if the selection of features is sufficient to confer a technical advantage or to differentiate the disclosure relative to the prior art. The selection comprises at least one feature, preferably a functional feature with no structural details, or with only a portion of the structural details if the portion alone is sufficient to confer a technical advantage or to differentiate embodiments of the disclosure relative to the prior art.

Both an embodiment of a system according to the disclosure and a method according to the disclosure will now be described in tandem.

Figure 1:
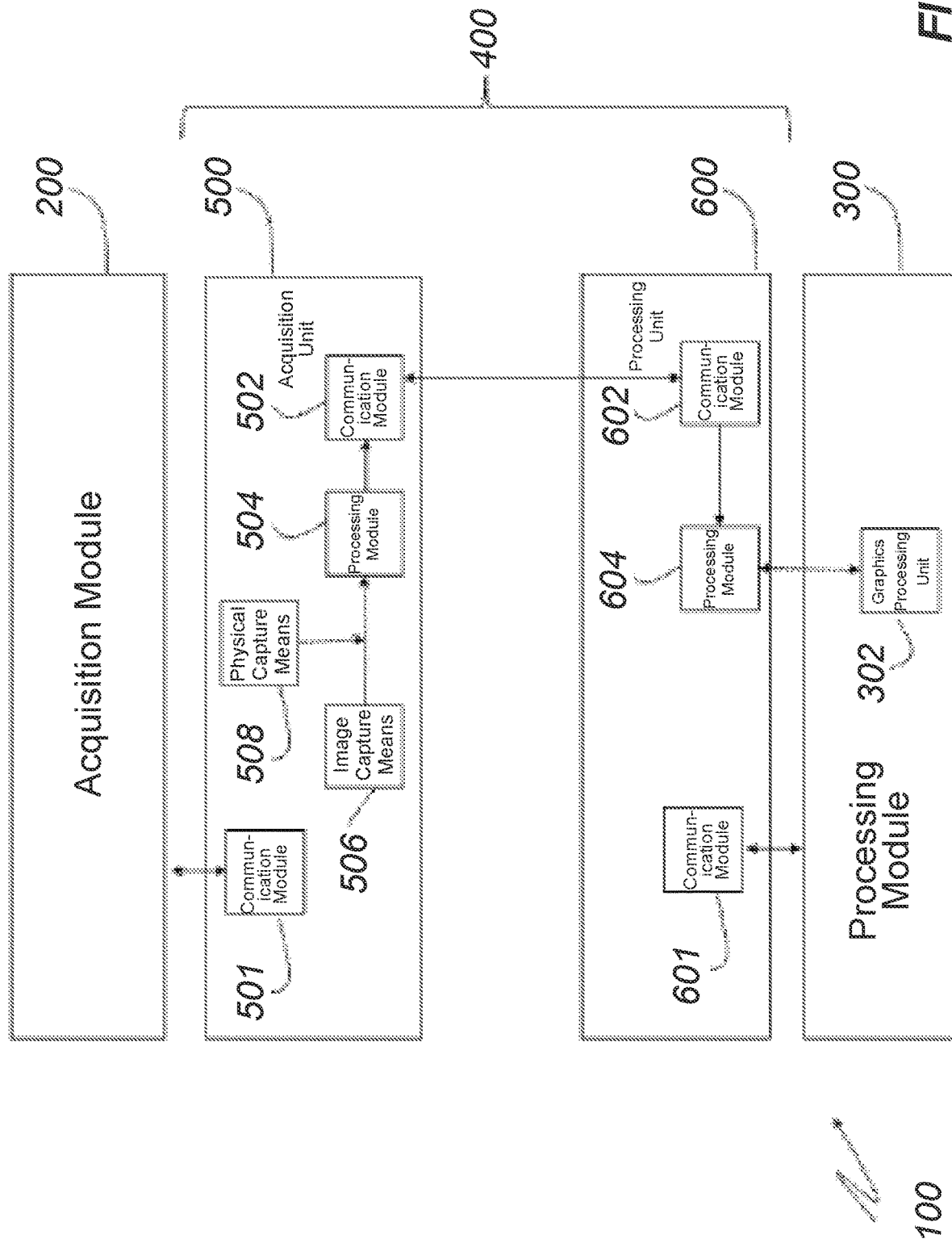
FIG. 1 is a schematic illustration of a first embodiment of a system according to the disclosure.

In a first embodiment shown in FIG. 1, a system 100 comprises an acquisition module 200, a processing module 300 and a device 400 for locating, by the processing module 300, the acquisition module 200 relative to a device to be monitored (which is not shown in this figure).

The locating device 400 comprises:

an acquisition unit 500 arranged at the side of the acquisition module 200, a processing unit 600 arranged at the side of the processing module 300.

The acquisition unit 500 comprises:

a module 501 for communicating with the acquisition unit 500;

a communication module 502 for communicating with the processing module 300;

a first processing module 504, configured to generate a first position of the acquisition module, and to generate an image, referred to as a high-resolution image, of the device to be monitored.

The processing unit 600 comprises:

a module 601 for communicating with the processing module 600;

a communication module 602 for communicating with the acquisition module 200;

a processing module 604 configured to generate a second position, from the first position and from the high-resolution image.

The communication modules 502 and 602 form means for transmitting the first position and the high-resolution image from the acquisition module 200 to the processing module 300. The communication modules may or may not be wireless.

Thus, it becomes possible to transfer the computational load in the region of the processing module 300 and thus to reduce the computational power arranged in the region of the acquisition module 200, in other words, in the region of the measurement device.

In the example shown, the processing module 300 comprises a graphics processing unit 302 arranged in the region thereof. The graphics processing unit is configured to be used by the processing module 300.

In the example shown, the acquisition unit 500 comprises image capture means 506, referred to as high-resolution image capture means, the image generated by the first processing means 504 being generated from data captured by the high-resolution image capture means 506.

As an example, the high-resolution image capture means 506 comprise an objective having a focal length, referred to as a long focal length, of 25 mm.

Still in the example shown, the acquisition unit 500 comprises capture means 508 for capturing physical quantities arranged in the region of the acquisition module 200 and configured to capture a physical quantity and generate capture data, the first processing means 504 also being configured to generate the first position from the capture data.

As an example, the capture means 508 comprise an inertial unit.

In the embodiment described, the capture means 508 comprise image capture means, referred to as low-resolution image capture means, the capture data being images generated by the image capture means.

The low-resolution image capture means are configured such that the images generated comprise a capture of the element to be monitored in its entirety.

As an example, the low-resolution image capture means comprise an objective having a focal length, referred to as a short focal length, substantially equal to 7 mm.

Moreover, the processing means arranged in the region of the processing module are also configured to generate:
  simulation data for a projection of a digital model of the device to be monitored onto the high-resolution image,
  data on the state of compliance of the device to be monitored relative to the digital model of the device to be monitored.

Figure 2:
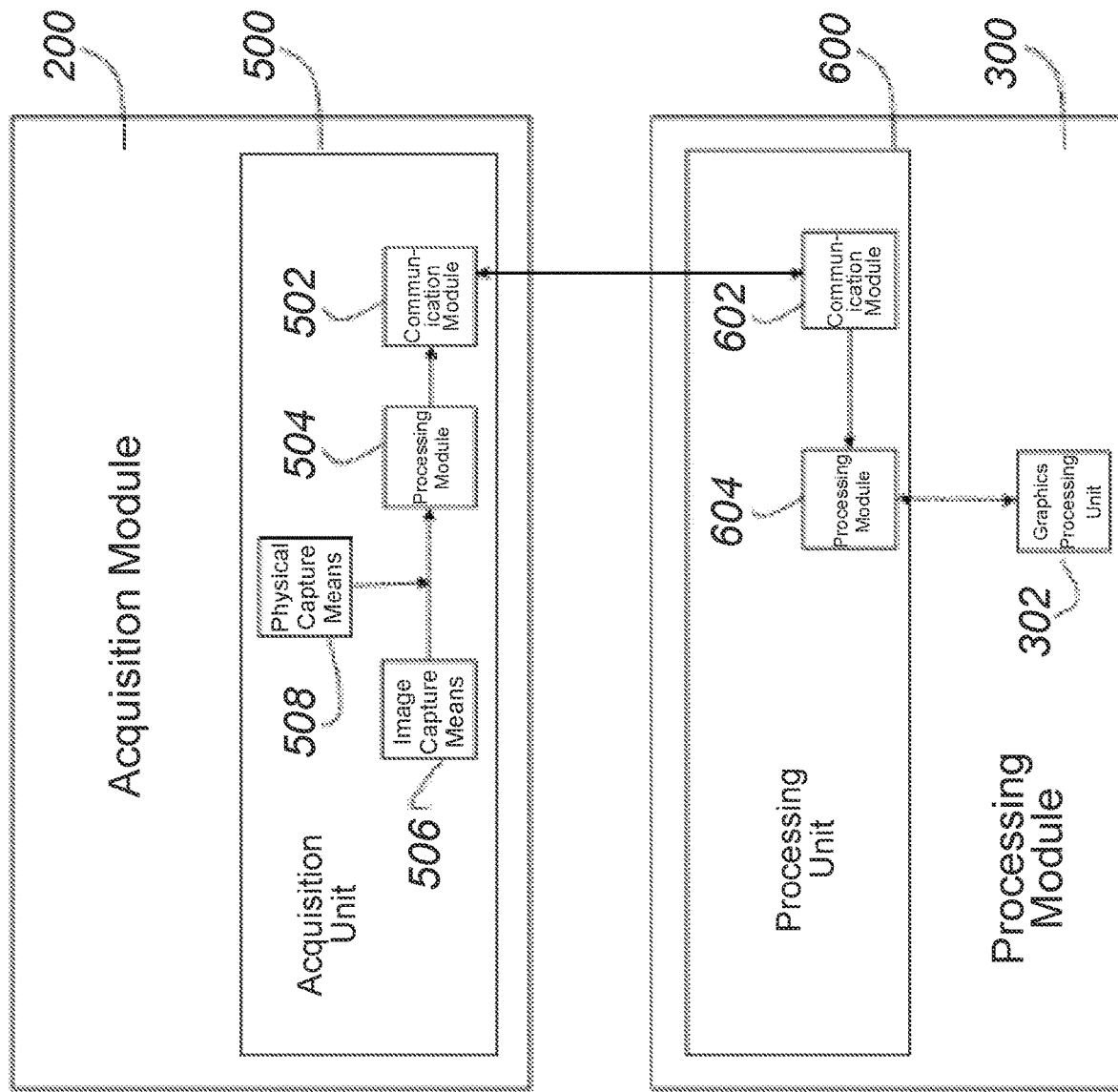
FIG. 2 is a schematic illustration of a second embodiment of a system according to the disclosure.

In a second embodiment, shown in FIG. 2, of a system 101 according to the disclosure, the acquisition unit 500 is incorporated in the acquisition module 200 and the processing unit 600 is incorporated in the processing module 300.

In this embodiment, the acquisition unit 500 does not comprise a module 501 for communicating with the acquisition module 200 as the processing unit is incorporated in the acquisition module 200 and the processing unit 600 does not comprise a communication module 601 as the processing unit is incorporated in the processing module 300.

In this embodiment, each module of the device according to the disclosure may be a software module or an electronic module that uses computational means such as a computer or a processor, already present on the acquisition module or the processing module.

Moreover, the communication modules 502, 602 may be existing modules within the acquisition module or the processing module arranged to carry out the required operations.

Figure 3:
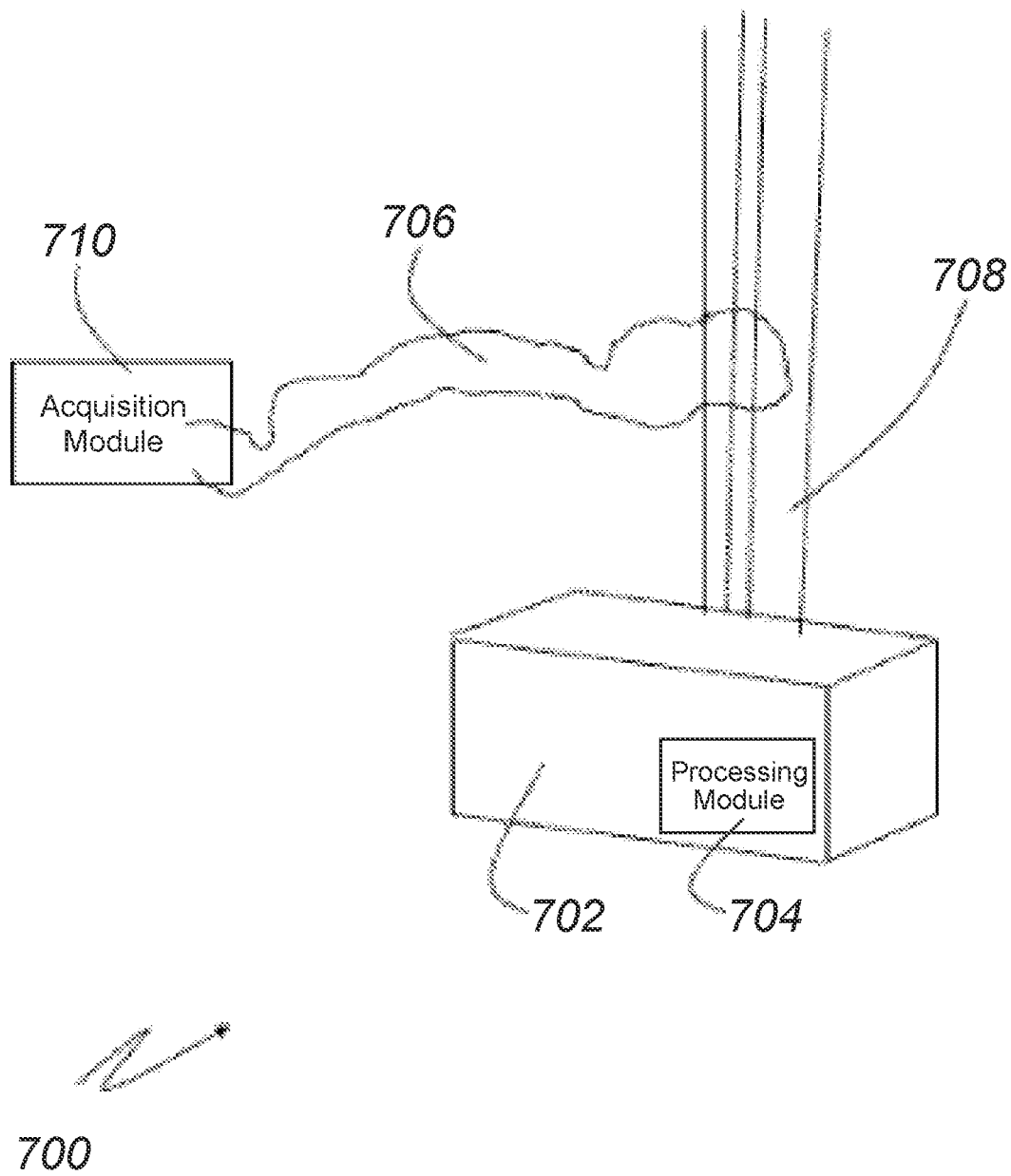
FIG. 3 is a schematic illustration of a configuration of a system according to the disclosure.

In the configuration shown in FIG. 3, the system 700 according to the disclosure comprises an autonomous platform 702 supporting a processing module 704 and a cobot-type robot 706, supported by a mast 708 mounted on the autonomous platform 702.

More precisely, the end of the robot 706 is mounted in translation and in rotation relative to the mast 708, by means of a plate mounted on rails fixed on the mast 708.

The other end of the robot 706 has an effector housing the acquisition module 710.

Implementation of the method according to the present disclosure is carried out using the following steps:
  processing, by the processing means arranged in the region of the acquisition module 710, to generate a first position of the acquisition module 710, and to generate an image, referred to as a high-resolution image, of the device to be monitored;
  transmission, by the transmission means of the first position and the high-resolution image, from the acquisition module 710 to the processing module 704,
  processing by the processing means, arranged in the region of the processing module 704, to generate a second position from the first position and from the high-resolution image.

According to another possible configuration, the acquisition module is a digital tablet and the processing module is a computer comprising a graphics card.

An operator uses the digital tablet to record a video stream that is subsequently taken up by the processing module and reprocessed. The digital tablet then uses images having a low resolution level to determine a first position by itself. This is a pyramid approach where the full resolution image captured by the high-resolution acquisition module is reduced over a plurality of levels. On the processing computer, a higher pyramid level is then used to make use of the full resolution.

A first acquisition may thus be carried with a lightweight means (tablet) and then post-processing of the acquisition results is carried out to analyze the sequence with a more powerful machine that makes it possible both to refine the initial estimated location and also to carry out checks based on the video.

Of course, the claimed invention is not limited to the examples that have just been described and numerous modifications may be made to the examples without departing from the scope of the invention as defined by the claims. Moreover, the different features, forms, variants and embodiments of the disclosure may be associated with one another in various combinations provided these are not incompatible with one another or mutually exclusive.

The invention claimed is:

1. A device for locating, by a processing module arranged in a region of a frame of a robot, an acquisition module relative to a device to be monitored, the acquisition module being an effector of the robot, the device comprising:
  low-resolution image capture means arranged in the region of the acquisition module and configured for generating low-resolution images of an element to be monitored in its entirety;
  high-resolution image capture means, also arranged in the region of the acquisition module, distinct from said low-resolution image capture means and configured for capturing image data of the element to be monitored;
  first processing means arranged in a region of the acquisition module, configured to generate a first position of the acquisition module from the low-resolution images captured by the low-resolution image capture means, and to generate a high-resolution image of the device to be monitored from the data captured from the high-resolution image capture means;
  means for transmitting the first position and the high-resolution image from the acquisition module to the processing module; and
  second processing means arranged in a region of the processing module and configured to generate a second position from the first position and the high-resolution image.

2. The device of claim 1, further comprising a graphics processing unit arranged in the region of the processing module.

3. The device of claim 1, wherein the high-resolution image capture means comprise an objective having a focal length of between 18 mm and 50 mm.

4. The device of claim 1, wherein the low-resolution image capture means comprise an objective having a focal length of between 4.5 mm and 10 mm.

5. The device of claim 1, wherein the processing means arranged in the region of the processing module are also configured to generate:
  data for simulating a projection of a digital model of the device to be monitored onto the high-resolution image; and
  data on a state of compliance of the device to be monitored relative to the digital model of the device to be monitored.

6. A system, comprising:
  an acquisition module,
  a processing module,
  a device for locating, by the processing module, an acquisition module relative to a device to be monitored according to claim 1.

7. The system of claim 6, wherein the acquisition module is a digital tablet.

8. A method for locating, by a processing module arranged in a region of a frame of a robot, an acquisition module relative to a device to be monitored, the acquisition module being an effector of the robot, the method comprising:
  capturing, by low-resolution image capturing means arranged in a region of the acquisition module, low-resolution images of an element to be monitored in its entirety;
  capturing, by high-resolution image capturing means arranged in the region of the acquisition module and distinct from the low-resolution image capturing means, high-resolution image data of the element to be monitored;
  processing, by processing means arranged in a region of the acquisition module, the low-resolution images captured by the low-resolution image capturing means to generate a first position of the acquisition module, and the high-resolution image data captured by the high-resolution image capturing means to generate a high-resolution image of the device to be monitored;
  transmission by transmission means of the first position and the high-resolution image from the acquisition module to the processing module; and
  processing by the processing means arranged in a region of the processing module, to generate a second position from the first position and from the high-resolution image.

9. The method of claim 8, wherein the processing to generate the second position from the high-resolution image is carried out using the high-resolution image in its entirety.

10. The method of claim 8, wherein the processing to generate the second position from the high-resolution image is carried out from a selection of a portion of the high-resolution image.

11. The method of claim 8, further comprising additional processing, by the processing means arranged in the region of the processing module, to generate a third position, from the second position and from a digital model of the device to be monitored.

12. A method for monitoring, by a processing module, a device to be monitored from images of the device to be monitored, acquired by an acquisition module comprising the steps of:
  capturing, by low-resolution image capturing means arranged in a region of the acquisition module, low-resolution images of an element to be monitored in its entirety;
  capturing, by high-resolution image capturing means arranged in the region of the acquisition module and distinct from the low-resolution image capturing means, high-resolution image data of the element to be monitored;
  processing, by processing means arranged in a region of the acquisition module, the low-resolution images captured by the low-resolution image capturing means to generate a first position of the acquisition module, and the high-resolution image data captured by the high-resolution image capturing means to generate a high-resolution image of the device to be monitored;
  transmission by transmission means of the first position and the high-resolution image from the acquisition module to the processing module; and
  processing by the processing means arranged in a region of the processing module, to generate a second position from the first position and from the high-resolution image;
  simulating, by the processing means arranged in the region of the processing module, a projection of a digital model of the device to be monitored onto the high-resolution image to generate a simulated image; and
  obtaining a state of compliance of the device to be monitored relative to the digital model of the device to be monitored.

13. The method of claim 12, further comprising, between the simulation step and the step of obtaining a state of compliance, comparing the simulated image with one or more images of the device to be monitored.

14. The method of claim 12, further comprising acquiring an image of the device to be monitored from the high-resolution image.

* * * * *